US009292329B2

(12) United States Patent
Sanghvi et al.

(10) Patent No.: US 9,292,329 B2
(45) Date of Patent: Mar. 22, 2016

(54) VIRTUAL SWITCH INTERCEPTOR

(75) Inventors: Ashvin Sanghvi, Sammamish, WA (US); Ilarie Letca, Redmond, WA (US); Alexandre Coelho, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 12 days.

(21) Appl. No.: 13/025,042

(22) Filed: Feb. 10, 2011

(65) Prior Publication Data
US 2012/0210318 A1 Aug. 16, 2012

(51) Int. Cl.
G06F 15/173 (2006.01)
G06F 9/455 (2006.01)
H04L 12/24 (2006.01)
H04L 12/713 (2013.01)
H04L 12/931 (2013.01)

(52) U.S. Cl.
CPC ........ *G06F 9/45558* (2013.01); *G06F 9/45533* (2013.01); *H04L 41/06* (2013.01); *G06F 2009/45591* (2013.01); *G06F 2009/45595* (2013.01); *H04L 41/04* (2013.01); *H04L 41/22* (2013.01); *H04L 45/586* (2013.01); *H04L 49/70* (2013.01)

(58) Field of Classification Search
CPC ................. G06F 9/45558; G06F 2009/45591; G06F 2009/45595
USPC ................. 709/223–226, 229; 718/1
See application file for complete search history.

(56) References Cited

U.S. PATENT DOCUMENTS

| 7,177,311 | B1 | 2/2007 | Hussain et al. | |
|---|---|---|---|---|
| 7,685,635 | B2 | 3/2010 | Vega et al. | |
| 8,018,938 | B1* | 9/2011 | Fromm et al. | 370/392 |
| 8,102,781 | B2* | 1/2012 | Smith | 370/252 |
| 8,204,984 | B1* | 6/2012 | Aziz et al. | 709/224 |
| 8,539,074 | B2* | 9/2013 | Bartfai-Walcott et al. | 709/225 |
| 8,599,854 | B2* | 12/2013 | Srinivasan et al. | 370/392 |
| 8,612,559 | B2* | 12/2013 | Kuik | 709/221 |
| 8,707,417 | B1* | 4/2014 | Liang et al. | 726/11 |
| 2004/0006724 | A1* | 1/2004 | Lakshmanamurthy et al. | 714/25 |
| 2005/0114490 | A1* | 5/2005 | Redlich et al. | 709/223 |
| 2006/0209695 | A1* | 9/2006 | Archer et al. | 370/235 |

(Continued)

FOREIGN PATENT DOCUMENTS

| CN | 101765225 A | 6/2010 |
|---|---|---|
| TW | 200821936 A | 5/2008 |
| TW | 201023042 A | 6/2010 |

OTHER PUBLICATIONS

"International Search Report", Mailed Date: Aug. 29, 2012, Application No. PCT/US2012/024740, Filed Date: Feb. 10, 2012, pp. 10.

(Continued)

*Primary Examiner* — Michael Y Won
(74) *Attorney, Agent, or Firm* — Kate Drakos; Henry Gabryjelski; Micky Minhas

(57) ABSTRACT

Application management is facilitated by observing messages communicated amongst virtual applications external to application-hosting virtual machines. In one instance, the messages can be observed from within a virtual switch outside hosting virtual machines. One or more actions can subsequently be performed as a function of the messages such as but not limited to application monitoring as well as message routing, filtering, and/or transformation.

23 Claims, 9 Drawing Sheets

(56) References Cited

U.S. PATENT DOCUMENTS

| | | | |
|---|---|---|---|
| 2007/0186212 A1* | 8/2007 | Mazzaferri et al. | 718/1 |
| 2007/0266149 A1 | 11/2007 | Cobb et al. | |
| 2008/0025230 A1 | 1/2008 | Patel | |
| 2008/0031235 A1 | 2/2008 | Harris et al. | |
| 2009/0024994 A1 | 1/2009 | Kannan et al. | |
| 2009/0073895 A1 | 3/2009 | Morgan et al. | |
| 2009/0198769 A1 | 8/2009 | Keller et al. | |
| 2009/0204723 A1* | 8/2009 | Tonsing et al. | 709/238 |
| 2009/0290501 A1 | 11/2009 | Levy | |
| 2010/0077395 A1* | 3/2010 | Edwards et al. | 718/1 |
| 2010/0107162 A1 | 4/2010 | Edwards et al. | |
| 2010/0131636 A1* | 5/2010 | Suri et al. | 709/224 |
| 2010/0169880 A1 | 7/2010 | Haviv et al. | |
| 2010/0251263 A1 | 9/2010 | Coelho et al. | |
| 2010/0269171 A1 | 10/2010 | Raz | |
| 2011/0085560 A1* | 4/2011 | Chawla et al. | 370/401 |
| 2011/0145418 A1* | 6/2011 | Pratt et al. | 709/227 |
| 2011/0202920 A1* | 8/2011 | Takase | 718/1 |
| 2012/0069850 A1* | 3/2012 | Desai et al. | 370/400 |
| 2012/0210318 A1* | 8/2012 | Sanghvi et al. | 718/1 |
| 2012/0210434 A1* | 8/2012 | Curtis et al. | 726/25 |

OTHER PUBLICATIONS

Travostino, et al., "Seamless Live Migration of Virtual Machines over the MAN/WAN", Retrieved at <<www.francotravostino.name/papers/VMT.pdf>>, Elsevier Future Generation Computer Systems, 2006, pp. 10.

Guraja, Tulasi, "Performance of a Web Service using NetMon", Retrieved at<<http://www.codeproject.com/KB/XML/usingNetMon.aspx>>, May 8, 2005. pp. 7.

CN Notice on the First Office Action for Application No. 201210029029.3, May 29, 2014.

CN Notice on the Second Office Action for Application No. 201210029029.3, Jan. 16, 2015.

CN Notice on the Third Office Action for Application No. 201210029029.3, Jul. 15, 2015.

TW Search Report for Application No. 101100599, Aug. 19, 2014.

EP Communication for Application No. 12745327.2, Reference EP88876RK900ams, Jun. 2, 2014.

EP Communication for Application No. 12745327.2-1954, Reference EP88876RK900ams, Nov. 2, 2015.

CN Notice on the Fourth Office Action for Application No. 201210029029.3, Jan. 8, 2016.

* cited by examiner

VIRTUAL SWITCH INTERCEPTOR

BACKGROUND

Information technology (IT) professionals are responsible for managing computational resources for enterprises. Often such IT professionals are tasked with reducing cost and improving operational efficiency. However, data centers can quickly approach capacity and purchasing new servers increases capital and operating expenses, among other costs. At the same time, servers are typically and substantially underutilized, and provisioning new machines is a lengthy process that makes it difficult to be responsive to rapidly changing business needs.

Virtual machine technology facilitates increased physical resource utilization as well as agile machine provisioning. Traditionally, software applications are tightly coupled to physical servers on which they run. Virtual machine technology provides a layer of abstraction between the software applications and physical hardware and enables provisioning of multiple virtual machines on a single physical server, for example. As a result, workloads can be consolidated to improve physical asset utilization, and machines can be rapidly deployed and decommissioned, as needed.

To facilitate management, it is helpful to provide IT professionals with a means for monitoring resources be they physical, virtual, or both. For instance, metrics concerning performance or fault can be useful determining whether to add, remove, or move a machine. Such information can be acquired by way of application instrumentation.

Conventionally, agents are added to applications that monitor the applications and communicate pertinent information outside the application to management component for further processing. In other words, for each application, an agent is added, and there is a static relationship between an agent and a manager. By way of example, a virtual machine manager on a host server can receive status messages from a virtual machine with respect to an application by way of a local application agent.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to facilitating management of virtual applications. Messages from virtual applications can be observed external to application-hosting virtual machines and subsequently one or more actions can be performed as a function of the message. For instance, a virtual switch, or like mechanism, can be instrumented to observe messages communicated between locally and/or remotely hosted virtual applications and provide such messages to a management service for further processing. Performed actions can include monitoring application performance as well as routing, filtering, and/or transforming messages, among other things. Furthermore, information collected locally can be transmitted to a higher-level management tier to survive rapid placement and migration of virtual machines as well as scaling, updating, and renaming of physical machines.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Details below are generally directed toward facilitating virtual-application management. Conventionally, an agent/manager approach is employed, wherein a virtual-application is instrumented with an agent that can observe actions therein and provide information to a manger residing outside the application for further processing. However, the conventional approach is not well suited for current and future levels of virtualization. A single server can currently host tens of virtual machines, and, in the near future, a server will be able to host hundreds of virtual machines. Furthermore, the number of virtual machines resident on a server can change at a rapid pace as virtual machines are deployed, removed, and moved from one server to another server. The current agent manager approach requires first that an application be instrumented with an agent, which is not always the case, and second a static link be established between the agent and a manager. The sheer volume of virtual machines and associated dynamism is not conducive to this approach.

As described herein, application messages can be observed from outside an application and hosting virtual machine, wherein such messages correspond to communications between or amongst virtual applications. For example, a virtual switch or like component can be instrumented to observe messages. Subsequently, the observed messages can be analyzed and an action performed as a function of the message, among other things. For example, management metrics pertaining to application performance, errors, and/or exceptions can be generated. Additionally or alternatively, inbound and outbound messages can be re-routed, filtered, and/or transformed. Data collected at a local host server can also be provided to a management server for further processing of, and interaction with, applications across servers.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
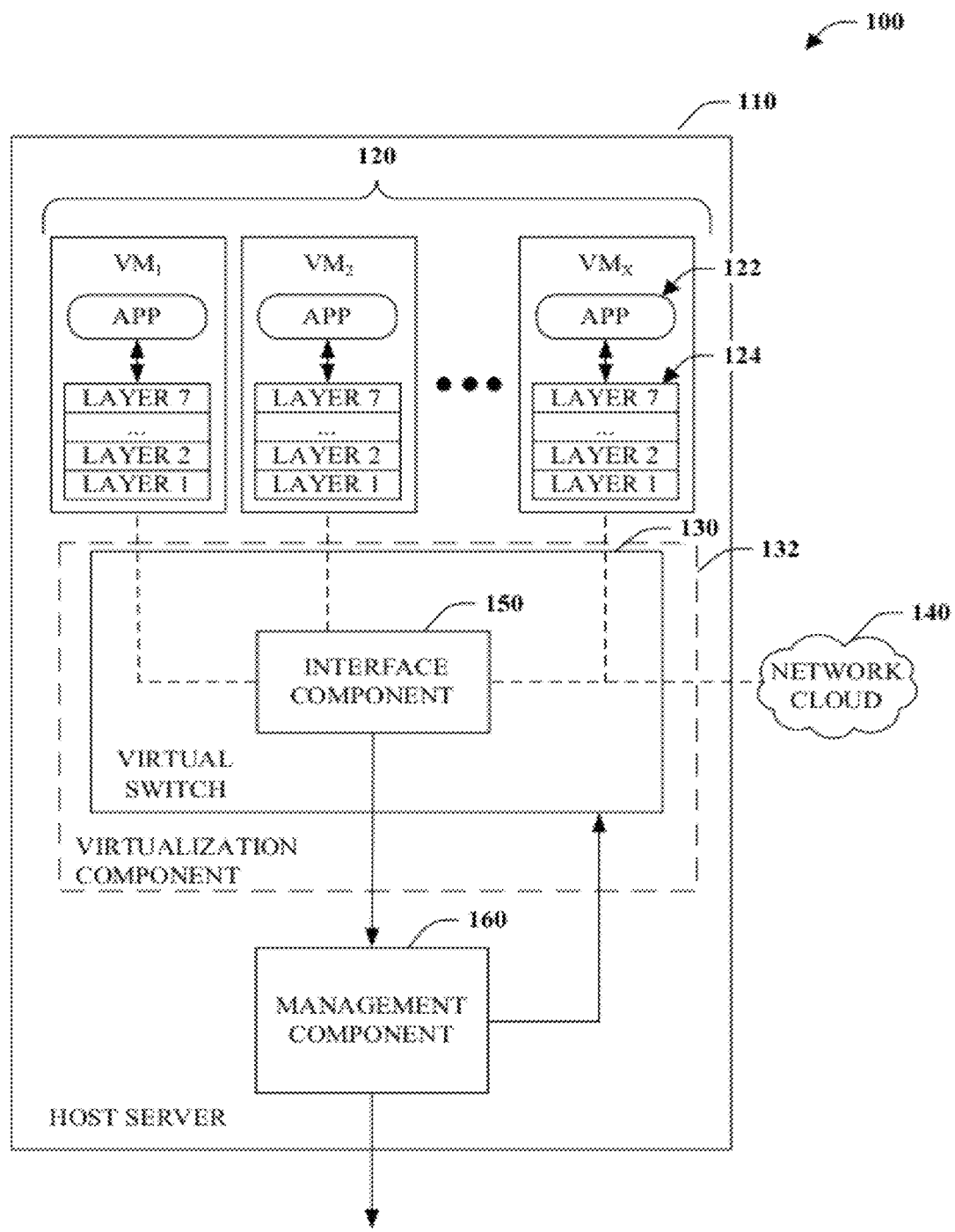
FIG. 1 is a block diagram of a system that facilitates virtual application management.

Referring initially to FIG. 1, a system 100 that facilitates virtual-application management is illustrated. As shown the system 100 includes a host server 110 that is a physical machine capable of hosting a plurality of virtual machines 120 ($VM_1$-$VM_X$, where "X" is a positive integer). Each of the virtual machines 120 can host one or more applications 122, including system and application software, and include a network protocol stack 124 that enables cross-application, and thus cross-virtual-machine, communication. Stated differently, an application 122 can send a message, by way of a hosting virtual machine 120, to one or more other applications 122 hosted by different virtual machines 120 and receive messages from the one or more other applications hosted by the different virtual machines 120. A message can be embodied as a data packet, such as a TCP/IP (Transmission Control Protocol/Internet Protocol) packet, a pointer to virtual-machine shared memory, or raw data for subsequent protocol processing, among other forms.

Virtual switch 130 is a component that enables communication by, among other things, routing messages to target virtual machines. The virtual switch 130 can be embedded within a virtualization component 132 (e.g., virtual machine monitor, hypervisor . . . ), a stand-alone application, or included within server hardware as firmware. As shown, messages can be routed by the virtual switch 130 to local virtual machines or to remote virtual machines that form part of a network of computers, or, in other words, a network cloud 140. Accordingly, the virtual switch 130 can allow for dynamic resource allocation locally as well as remotely. For example, a virtual machine 120 can migrate from one physical host to another, and the virtual switch 130 can re-route messages to its new location to maintain a communication link. Further, the virtual switch 130 can do more than simply forward data packets. The virtual switch 130 can also be responsible for various packet inspecting functions (given it is provided with requisite data). Accordingly, the virtual switch 130 can utilize provided or otherwise available credentials, certificates the like (e.g., from virtualization component 132) to provide readable data to facilitate inspection. Furthermore, note that virtual switch component 130 is not limited to being a virtual switch per se but rather can also encompass other like mechanisms, such as, but not limited to, virtual hubs and virtual routers.

Moreover, the virtual switch 130 can be instrumented with switch interface component 150 (a.k.a. simply interface component 150) that is configured to observe, or observe and intercept, communicated messages and forward the messages, or copies thereof, to management component 160 for further processing. In accordance with one embodiment, the interface component 150 can correspond to one or more application programming interfaces. Note that by positioning the interface component 150 outside application hosting virtual machine, observation is not dependent on whether an application has an agent capable of observing messages from within a virtual machine and it is easy to handle any number of virtual machines as they are dynamically deployed, removed, and/or moved.

In addition to communication traffic, the interface component 150 can be configured to acquired and provide the management component 160 with metadata regarding virtual machines. For example, such metadata can identify how a virtual machine is configured and what applications can be executed on the virtual machine. At least a portion of the metadata can be provided to the virtualization component 132, for example, upon deployment of a virtual machine, which can subsequently be provided by the interface component 150 to the management component 160.

The management component 160 is configured to perform an action as a function of application messages and optionally metadata acquired from the interface component 150. For instance, application message traffic can be monitored and utilized to compute metrics providing information about how an application is performing and whether or not any errors and/or exceptions occurred. Data can also be gathered to enable trending or other analysis. The management component 160 can also make decisions regarding routing, filtering, and transformation of messages based on messages exchanged and can communicate the decisions as instructions to the virtual switch 130 and/or perform the action specified by the instructions itself. Furthermore, actions performed by the management component 160 can be based on one or more policies and/or explicit instructions specified by a system administrator (IT professional), for instance.

By way of example and not limitation, information can be gathered regarding which virtual machine is communicating with which other virtual machines. Such information can be utilized to place virtual machines on the same host, enclosure, local area network, etc., if an isolation policy (e.g., specifies limitations on where a virtual machine can be placed relative to others) allows it, to improve performance by moving communicating virtual machines closer to one another thereby reducing communication costs.

Furthermore, it is to be appreciated that it is desirable to limit the impact of management on the primary functionality of a system. Accordingly, the management component 160 need not change or route messages, messages can be queued and leisurely processed at times less likely to affect system performance negatively. Furthermore, if messages are arriving in the queue faster than they can be processed, messages can simply be dropped and not processed at all.

Figure 2:
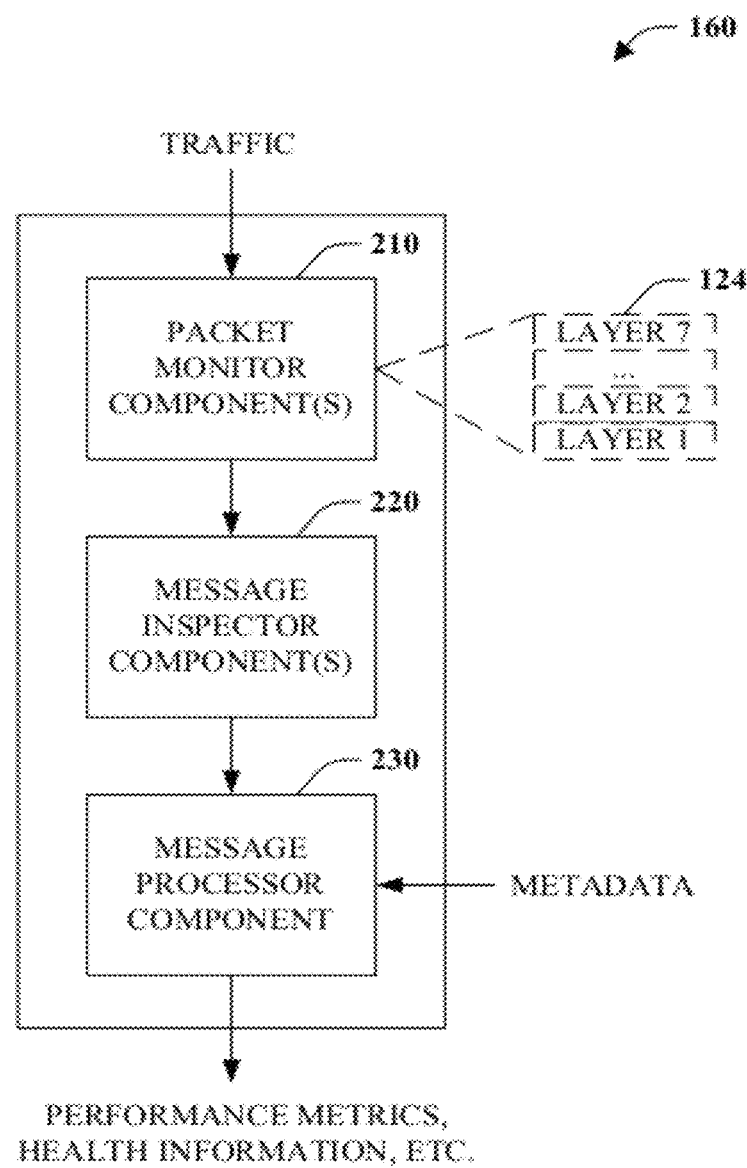
FIG. 2 is a block diagram of a representative management component.

FIG. 2 depicts a representative management component 160 in further detail. The management component 160 includes one or more packet monitor components 210, one or more message inspector components 220, and a message processor component 230. The one or more packet monitor components 210 and message inspector components 220 provide pre-processing operations to enable the message processor component 230 to perform actions at a higher level of abstraction.

The one or more packet monitor components 210 can be configured to utilize known or novel techniques to rebuild an application-generated message (e.g., a whole soap envelope or HTTP request) from smaller communicated units. Stated differently, the one or more packet monitor components 210 can be configured to parse network traffic and interpret the messages at any layer in the stack for a set of network protocols (a.k.a. communication protocols). In furtherance thereof, a packet monitor component 210 can be configured to recompose a network stack (e.g., layers 4-7 (transport, session, presentation, application)) from observation of lower layers (e.g., layers 2 (data) and 3 (network)). In accordance with one manner of implementation, such functionality can be enabled by running a copy of same protocol stack 124 running inside a virtual machine. In this manner, messages can be understood at different layers (e.g., Layer 2, IP, TCP, HTTP, Soap . . . ) and decryption, where applicable, can be applied at the appropriate level. Similarly, since a network-protocol stack can be interpreted at whatever level is required, policies that at least affect an action to be performed can be specified at arbitrary levels (e.g., data packet level, message level . . . ). Note also that the one or more packet monitor components 210 can be technology dependent (e.g., monitor component for operating system A, monitor component for operating system B).

The one or more message inspector components 220 can be configured to inspect communications for a particular technology on one or more designated layers of the network stack. Further, the one or more message inspector components 220 can be tasked with identifying pairs of requests and replies for a particular technology and stack layer. Once message pairs are identified, they can be provided to the message processor component 230 for further processing.

The message processor component 230 provides additional processing associated with the messages provide by the one or more message inspector components 220. More particularly, the message processor component 230 can utilize metadata regarding a virtual machine including supported applications, among other things, to aid in associating messages with specific applications. Subsequently, any number of operations can be performed with respect to the message data. For example, performance metrics can be computed, health information derived and event data collected regarding applications. Additionally, messages can be re-routed to other destinations, filtered, and/or transformed.

Figure 3:
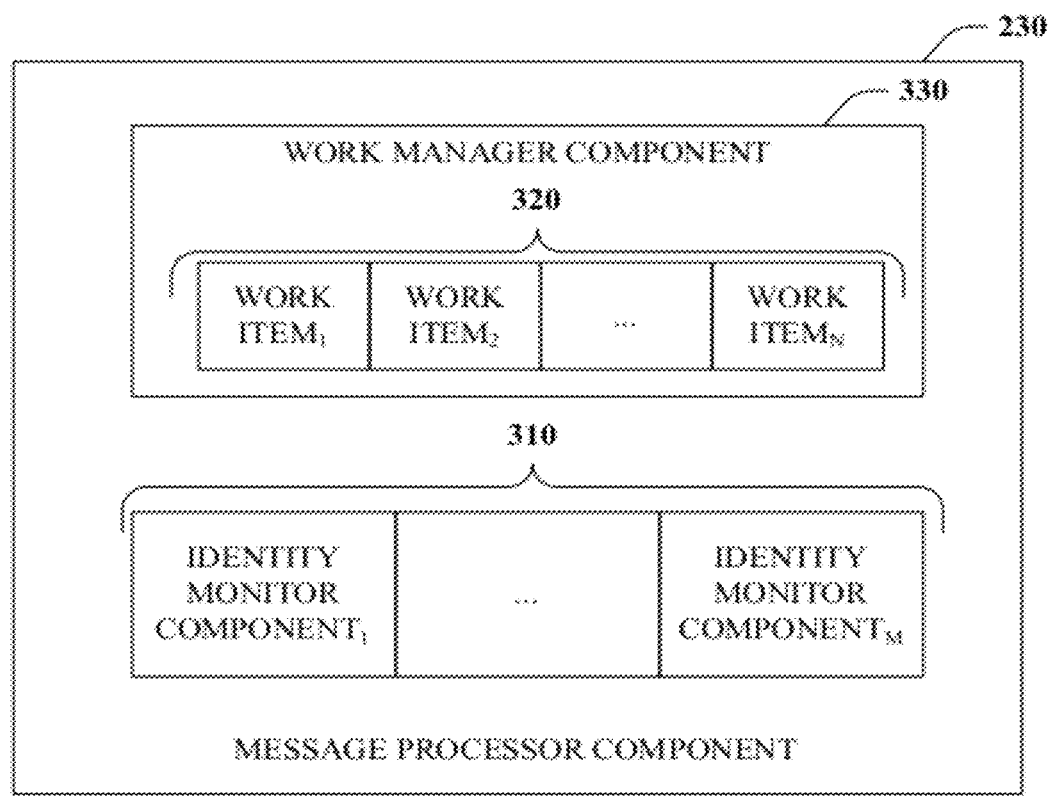
FIG. 3 is a block diagram of a representative message-processor component.

One representative embodiment of the message processor component 230 is depicted in FIG. 3. As illustrated, the message processor component 230 includes one or more identity monitor components 310 (IDENTITY MONITOR COMPONENT$_1$-IDENTITY MONITOR COMPONENT$_M$, where "M" is a positive integer) that are configured to identify the source or destination application as a function of the message itself and optionally metadata about one or more virtual machines associated with the message (e.g., sender, receiver). Once an application is associated with a message, one or more work items 320 (WORK ITEM$_1$-WORK ITEM$_N$, where "N" is a positive integer) can be generated defining actions to be performed. For example, a work item 320 can include instructions for storing application activity or instructions to report the occurrence of a software exception. In other words, a queue of work items is maintained.

Work manager component 330 is configured to schedule the work items 320, from the queue, for execution, for instance, as a function of contextual information (e.g., workflow item, CPU utilization, memory utilization . . . ). By way of example, where messages are not changed or routed, the queue of work items can be processes leisurely when an acceptable performance threshold is met to limit the impact on currently executing virtual applications. Furthermore, if the work manager component 330 and associated hardware cannot keep up with message processing, messages can simply be dropped, or in other words allowed to pass through without complete analysis and processing.

To monitor new or unsupported technologies, message inspector components 220 can be registered with the host server 110 (FIG. 1). However, the monitored data and how to configure, identify, or collect data about applications can largely be handled without being aware of a particular technology stack utilized to observe or otherwise acquire data.

Furthermore, since communication traffic outside virtual machines is the plug-in point of observation, virtual machine life times and configurations are not a concern with respect to message observation, interception or the like. In addition, once a virtual machine is configured to run and is started, virtualization software (e.g., hypervisor, virtual monitor, virtual switch . . . ) will have metadata about the virtual machine stored to aid identifying applications when messages for that virtual machine are observed. Similarly, a virtual machine can provide credentials (e.g., certificates) for decrypting encrypted communications, which can be utilized by the management component 160 to facilitate observation and processing of messages. More generally, data can be protocol dependent and comprehensible by the virtualization component 132 based in information provided by a virtual machine, for instance.

Figure 4:
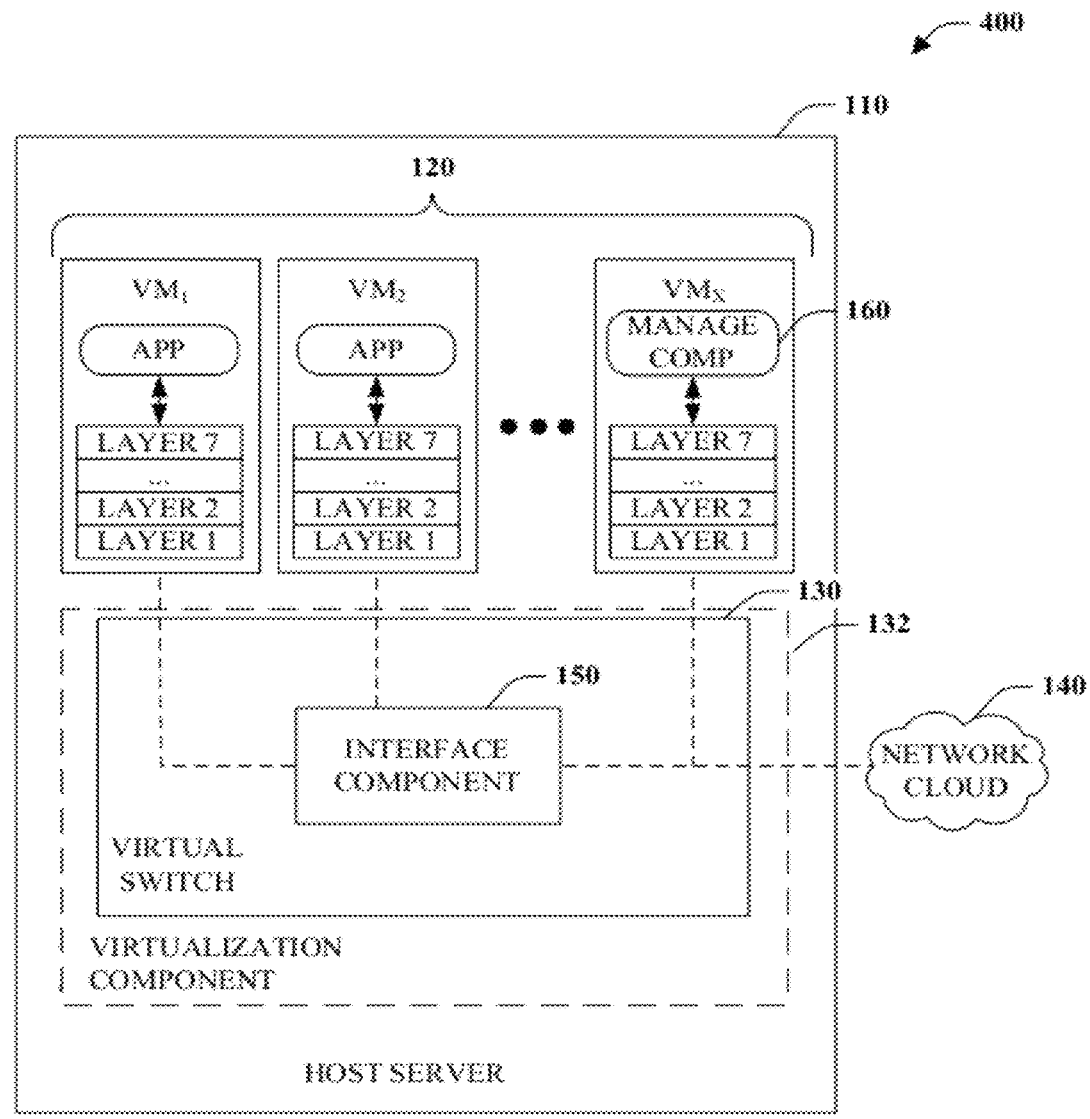
FIG. 4 is a block diagram of a system that facilitates virtual application management.

FIG. 4 depicts a system 400 that facilitates virtual application management. Similar to system 100 of FIG. 1, the system 400 comprises the host server 110 including the plurality of virtual machines 120 and the virtual switch 130, which here forms part of a virtualization component 132 (e.g., virtual machine monitor, hypervisor . . . ). The virtual switch 130 is instrumented with the interface component 150 to enable monitoring of communication between the plurality of virtual machines 120 as well as other virtual machines accessible by way of the network cloud 140. Unlike system 100 of FIG. 1, in this embodiment, the management component 160 is hosted by one of the plurality of virtual machines 120. In other words, the management component 160 is a virtual appliance (e.g., a software image designed to run inside a virtual machine). As shown here, the management component 160 is hosted by "VM$_X$." Accordingly, the interface component 150, upon observation, interception or the like of cross virtual-machine communication, can provide communication messages to the management component 160 by way of "VM$_X$." Similarly, note that the management component 160 could be located externally to the host server 110 (not shown) and accessible by way of the network cloud 140. In either embodiment, the management component 160 retains previously described functionality pertaining to performing various actions as a function of messages and optional metadata, among other things.

Figure 5:
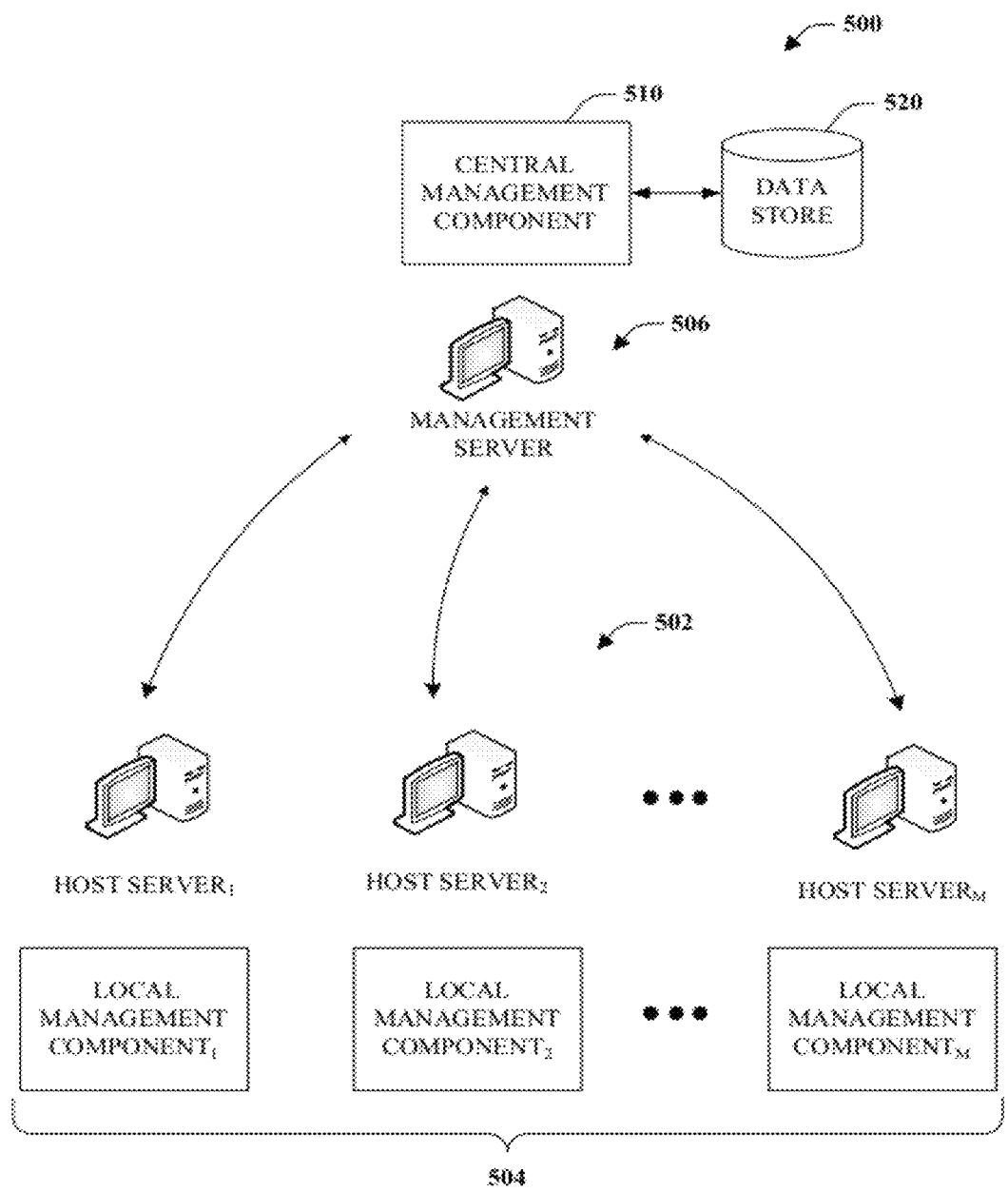
FIG. 5 is a block diagram of a system that facilitates tiered management of virtual applications.

Turning attention to FIG. 5, a system 500 that facilitates tiered management is illustrated. A number of local host servers 502 (HOST SERVER$_1$-HOST SERVER$_M$, where "M" is a positive integer) can include respective local management components 504 (LOCAL MANAGEMENT COMPONENT$_1$-LOCAL MANAGEMENT COMPONENT$_M$, where "M" is a positive integer) corresponding to the management component 160 of FIGS. 1, 2, and 4. Data collected by each of the local management components 504 can be provided to a management server 506 that includes a central management component 510. Among other things, the central management component 510 can store application definitions, or, in other words, application metadata, in the data store 520 to enable subsequent modeling of an application and the application's state. Additionally, various data can be collected regarding applications and housed in the data store 520 for analysis and trending, among other things. Based on the analysis, administrator input, and/or other factors, the central management component 510 can instruct one or more of the local management components 504 to perform an action or implement a policy. For example, the central management component 510 can coordinate load balancing across the host servers 502. To enable a virtual machine to be moved during execution from host to host while maintaining an understanding of messages, virtual-machine live migration can occur within a TCP (Transport Control Protocol) time out and the central management component 510 can include a running copy of the same protocol stack as the virtual machine being moved.

The system 500 illustrates a two-tier hierarchical management structure wherein the first tier corresponds to the local management components 504 residing on respective host servers 502 and the second tier corresponds to the central management component 510 executed by the management server 506. The structure is conducive to application management in the presence of large numbers of virtual machines and rapid placement and migration of virtual machines as well as scaling, updating, and renaming of physical machines. Furthermore, it should be appreciated that the system 500 is not limited to two-tiers, but rather is scalable to support an arbitrary number of tiers or hierarchical levels to facilitate management. By way of example and not limitation, a cluster of management servers can be overseen by a global management server (not shown), and/or an intermediate management server (not shown) can be injected between the host servers 502 and management server 506.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the local management components 504 and the global management component 510 can employ such mechanism to, among other things, determine, or infer, management strategies.

Figure 6:
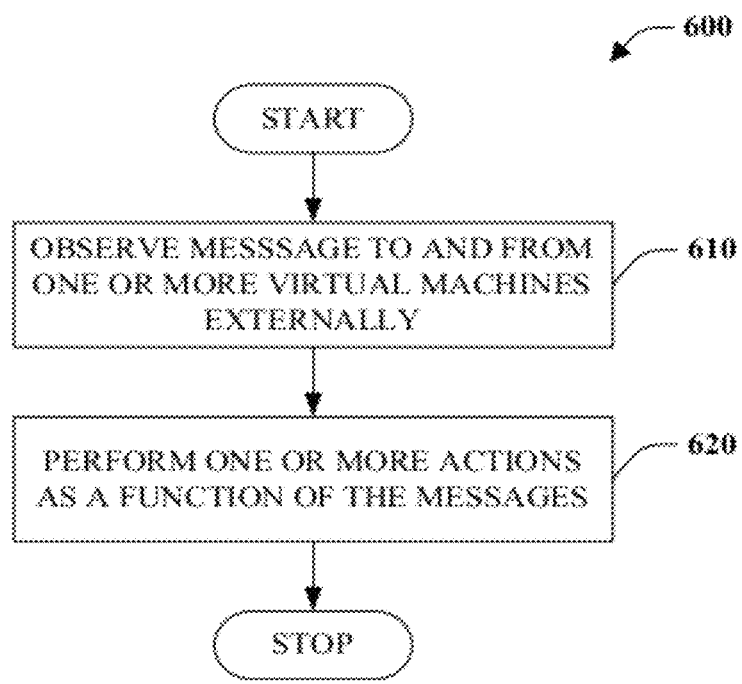
FIG. 6 is a flow chart diagram of a method of facilitating virtual-application management.
Figure 7:
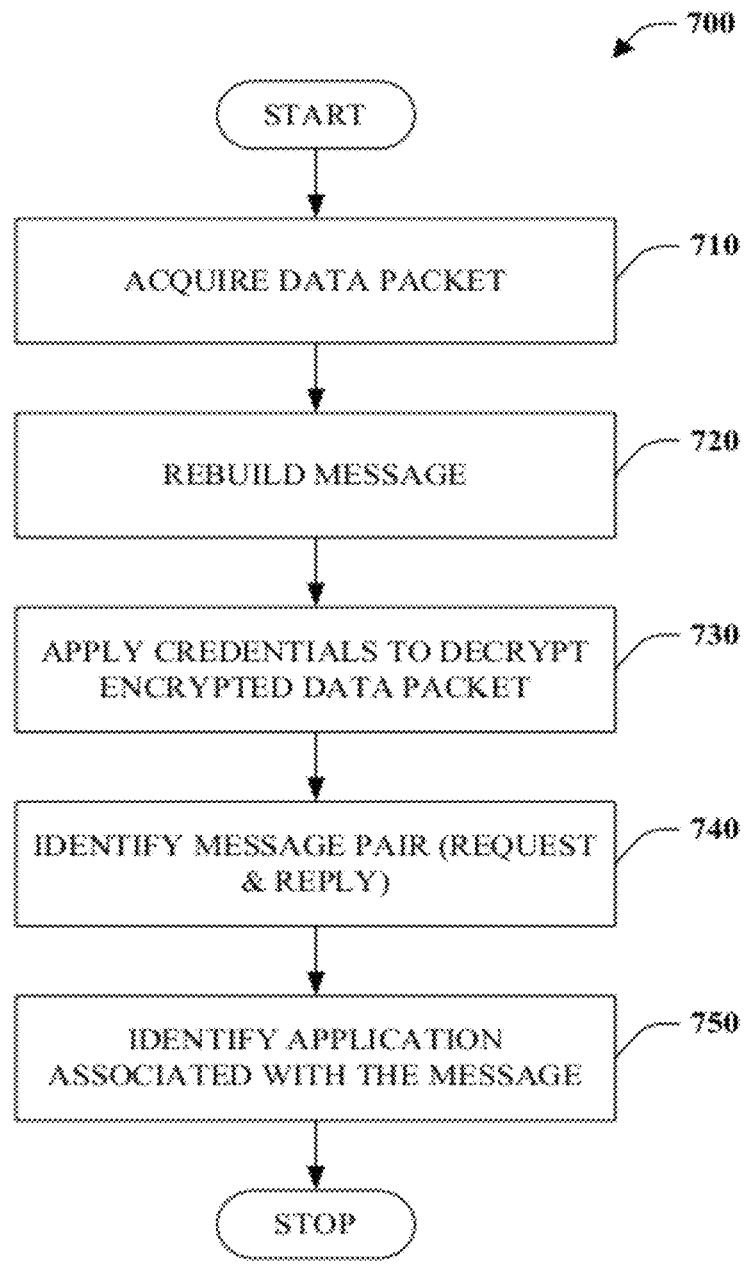
FIG. 7 is a flow chart diagram of a method of application communication processing.
Figure 8:
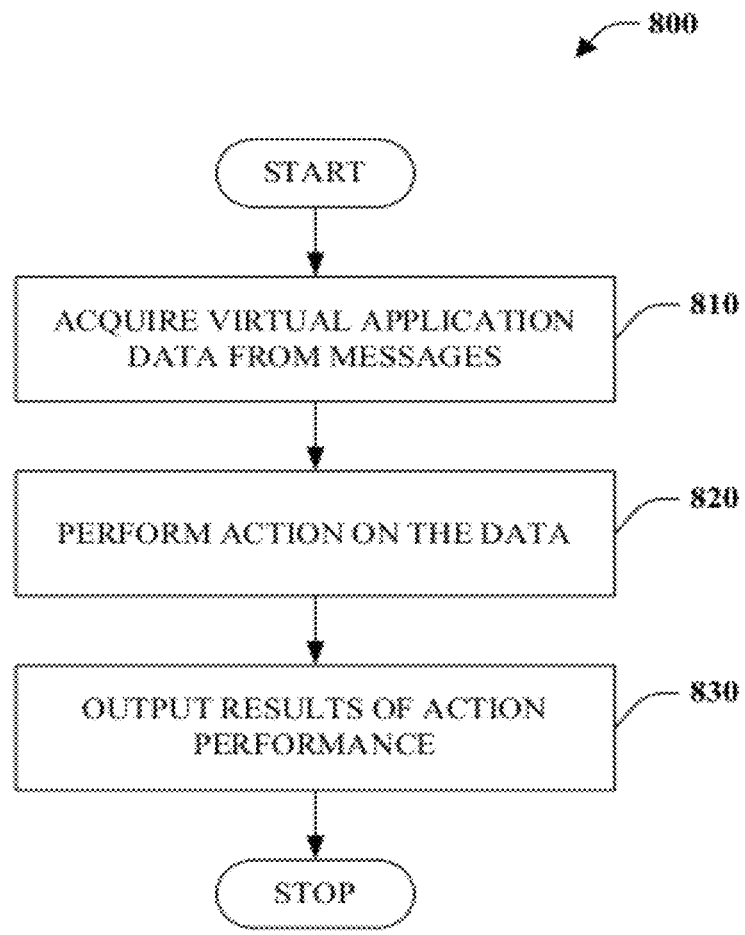
FIG. 8 is a flow chart diagram of a method of facilitating virtual application management.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 6, a method 600 that facilitates virtual-application management is illustrated. At reference numeral 610, messages to and from one or more virtual machines are observed. For example, an application can be distributed across two or more virtual machines and cross-application communications can be observed. Moreover, such observation, interception or the like can be performed external to the virtual machines. In one embodiment, such messages can take the form of TCP/IP data packets. However, messages are not limited thereto. By way of example, and not limitation, the messages can specify pointers to local memory shared by two or more virtual machines. Furthermore, it is not be appreciated that cross-application communication is not limited to local virtual machines but rather can include communication amongst virtual machine hosted by other network accessible physical servers.

At numeral 620, one or actions can be performed as a function of the messages. In one instance, an action can correspond to identifying a particular application to which a message corresponds based on the message and optionally virtual machine metadata. In another instance, an action can correspond to monitoring application messages and store the messaged for subsequent utilization. Additionally or alternatively, message data can be analyzed, correlated, aggregated, and/or thresholded, among other things, results of which can be utilized to route, filter and/or transform messages as well as place, migrate, update virtual machines, for instance. Furthermore, such actions can be performed based on or more policies or explicit instructions, for example specified by a system administrator. By way of example, and not limitation, policy-based message transformation can be performed utilizing appropriate level protocols based on the relative positions of source and destination virtual machines. That is, if the virtual machines are on the same host, memory block transfers can be performed; if they are on the same blade server enclosure, giant blocks can be transferred; if the virtual machines are located on the same local area network, aggressive blocking can be utilized; and if it is determined that transport control protocol is offloaded to a network interface card, a specific protocol can be used, like streaming.

FIG. 7 depicts a method 700 of application communication processing. At reference numeral 710, a data packet is acquired, for example from an interface that observes or intercepts application messages across virtual machines. At reference 720, the message is rebuilt. Utilizing known or novel mechanisms the application layer (Layer 7) and other intermediate layers of a network protocol stack can be a recomposed from the data link layer and/or the network layer (Layers 2 and 3) data packets. This can be accomplished, for example, by running a local copy of the same network protocol stack (e.g., implementation of a network protocol suit) as the virtual machine from which the data packet was acquired. At numeral 730, credentials are applied to decrypt an encrypted data packet or more specifically a network protocol-stack layer. Such credentials, or information regarding other security mechanisms, can be provided by a virtual machine upon placement, or in other words, deployment, on a host server and subsequently acquired and used to enable data to be read. At reference numeral 740, message pairs are identified, namely requests are paired with replies to respective requests, for instance, for a particular technology or network stack layer. At numeral 750, the application associated with the message is identified as a function of the message and optionally metadata regarding virtual machines.

FIG. 8 is a flow chart diagram illustrating a method of application management 800. At reference numeral 810, data is acquired from virtual application messages. For example, messages between locally and/or remotely hosted virtual applications can be observed, and the message content can be the data acquired. At numeral 820, one or more actions are performed on the data. For instance, the data can be stored for subsequent application modeling or trending and/or processed to compute how an application is performing or how packets should be routed, filtered, or transformed. Additionally, it is to be appreciated that the performed actions can also be dictated by policies or explicit instruction. At reference numeral 830, results of the one or more actions are output, for example to a system administrator or file for later analysis.

Furthermore, in the case where messages are intercepted and different routing is desired, the output can correspond to the re-routed message.

As described herein, virtual application management is facilitated by observing messages external to host-virtual machines, which is in contrast to conventional management systems that observer application activity at the application level by way of an agent. Nevertheless, the two approaches to application management need not be mutually exclusive. Rather, the subject approach to management can be augmented to accept output from application resident agents as opposed to or in addition to observing messages, for instance from a virtual switch. Similar information can be acquired from either approach. Furthermore, utilizing both approaches can provide a means for corroborating results, or in other words a means for improving confidence in the results produced by one approach.

To the extent used herein, the terms "component," "system," and "engine" as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 9:
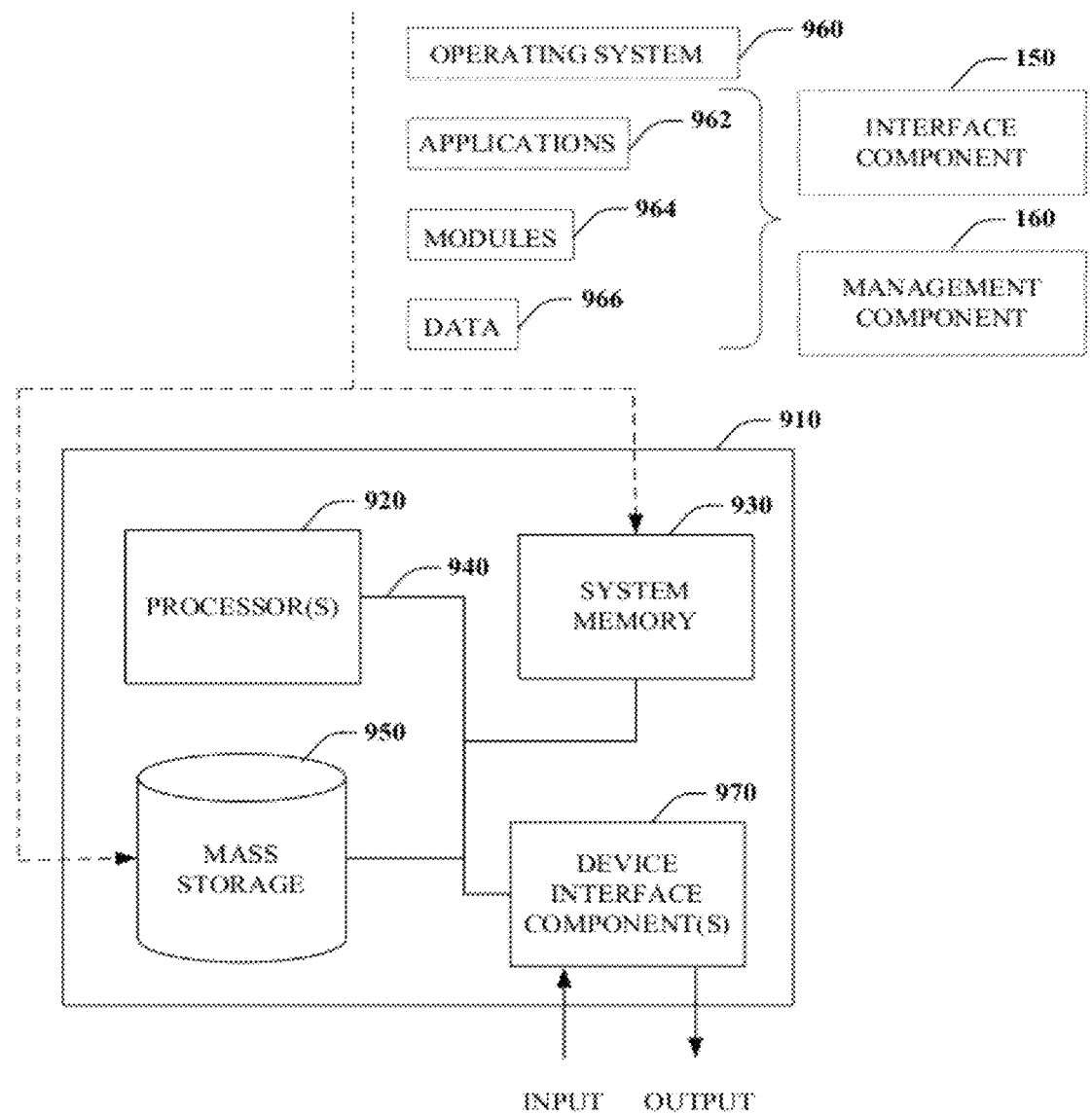
FIG. 9 is a schematic block diagram illustrating a suitable operating environment for aspects of the subject disclosure.

In order to provide a context for the claimed subject matter, FIG. 9 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 9, illustrated is an example general-purpose computer 910 or computing device (e.g., desktop, laptop, server, hand-held, programmable consumer or industrial electronics, set-top box, game system . . . ). The computer 910 includes one or more processor(s) 920, memory 930, system bus 940, mass storage 950, and one or more device interface components 970. The system bus 940 communicatively couples at least the above system components. However, it is to be appreciated that in its simplest form the computer 910 can include one or more processors 920 coupled to memory 930 that execute various computer executable actions, instructions, and or components stored in memory 930.

The processor(s) 920 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 920 may also be implemented as a combination of computing devices, for example a combination of a DSP and a microprocessor, a plurality of microprocessors, multi-core processors, one or more microprocessors in conjunction with a DSP core, or any other such configuration.

The computer 910 can include or otherwise interact with a variety of computer-readable media to facilitate control of the computer 910 to implement one or more aspects of the claimed subject matter. The computer-readable media can be any available media that can be accessed by the computer 910 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 910.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 930 and mass storage 950 are examples of computer-readable storage media. Depending on the exact configuration and type of computing device, memory 930 may be volatile (e.g., RAM), non-volatile (e.g., ROM, flash memory . . . ) or some combination of the two. By way of example, the basic input/output system (BIOS), including basic routines to transfer information between elements within the computer 910, such as during start-up, can be stored in nonvolatile memory, while volatile memory can act as external cache memory to facilitate processing by the processor(s) 920, among other things.

Mass storage 950 includes removable/non-removable, volatile/non-volatile computer storage media for storage of large amounts of data relative to the memory 930. For example, mass storage 950 includes, but is not limited to, one or more devices such as a magnetic or optical disk drive, floppy disk drive, flash memory, solid-state drive, or memory stick.

Memory 930 and mass storage 950 can include, or have stored therein, operating system 960, one or more applications 962, one or more program modules 964, and data 966. The operating system 960 acts to control and allocate resources of the computer 910. Applications 962 include one or both of system and application software and can exploit management of resources by the operating system 960 through program modules 964 and data 966 stored in memory 930 and/or mass storage 950 to perform one or more actions. Accordingly, applications 962 can turn a general-purpose computer 910 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the interface component 150 and management component 160 of system 100, or portions thereof, can be, or form part, of an application 962, and include one or more modules 964 and data 966 stored in memory and/or mass storage 950 whose functionality can be realized when executed by one or more processor(s) 920.

In accordance with one particular embodiment, the processor(s) 920 can correspond to a system on a chip (SOC) or like architecture including, or in other words integrating, both hardware and software on a single integrated circuit substrate. Here, the processor(s) 920 can include one or more processors as well as memory at least similar to processor(s) 920 and memory 930, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the interface component 150 and management component 160 and/or associated functionality can be embedded within hardware in a SOC architecture.

The computer 910 also includes one or more device interface components 970 that are communicatively coupled to the system bus 940 and facilitate interaction with the computer 910. By way of example, the device interface component 970 can be a port (e.g., serial, parallel, PCMCIA, USB, FireWire . . . ) or an interface card (e.g., sound, video . . . ) or the like. In one example implementation, the device interface component 970 can be embodied as a user input/output interface to enable a user to enter commands and information into the computer 910 through one or more input devices (e.g., pointing device such as a mouse, trackball, stylus, touch pad, keyboard, microphone, joystick, game pad, satellite dish, scanner, camera, other computer . . . ). In another example implementation, the device interface component 970 can be embodied as an output peripheral interface to supply output to displays (e.g., CRT, LCD, plasma . . . ), speakers, printers, and/or other computers, among other things. Still further yet, the device interface component 970 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method performed by a physical computing device, the method comprising:
   implementing, by the physical computing device, a virtual machine;
   communicatively coupling, by the physical computing device, the virtual machine to a virtual switch via which an application hosted by the virtual machine communicates via messages with another entity, where the virtual switch is implemented at least in part by the computing device;
   maintaining, by a management component implemented at least in part by the computing device, metadata that includes information describing the virtual machine, an identification of the application hosted by the virtual machine, and credentials associated with the messages;

observing, by an interface component of the virtual switch and based on the credentials and the identification of the application, at least a portion of the messages; and performing, by the management component, an action as a function of the observed at least a portion of the messages.

2. The method of claim 1 further comprising observing other messages of other virtual machines as they are deployed, removed, and moved.

3. The method of claim 2 where the metadata further includes additional information describing the other virtual machines, additional identification of other applications hosted on the other virtual machines, and additional credentials associated with other messages corresponding to the other applications.

4. The method of claim 1 further comprising decrypting, by the interface component using the credentials, the at least a portion of the messages.

5. The method of claim 1 further comprising receiving a policy that influences the action performed.

6. The method of claim 5 further comprising interpreting the messages at a network-protocol-stack level based on the policy.

7. The method of claim 1 further comprising forward, by the interface component, at least some of the messages, or copies thereof, to the management component.

8. The method of claim 1 further comprising communicating results of the action to a management server.

9. A system comprising:
at least one physical processor;
a virtual machine implemented at least in part by the at least one physical processor;
a virtual switch communicatively coupled to the virtual machine and via which an application hosted by the virtual machine communicates via messages with another entity;
memory coupled to the at least one physical processor, the memory comprising metadata that includes information describing the virtual machine, an identification of the application hosted by the virtual machine, and credentials associated with the messages;
an interface component of the virtual switch configured to observe, based on the credentials and the identification of the application, at least a portion of the messages; and
a management component configured to perform an action as a function of the observed at least a portion of the messages.

10. The system of claim 9, the interface component further configured to decrypt, using the credentials, the at least a portion of the messages.

11. The system of claim 9 where the interface component is further configured to observe other messages of other virtual machines as they are deployed, removed, and moved.

12. The system of claim 11 where the metadata further includes additional information describing the other virtual machines, additional identification of other applications hosted on the other virtual machines, and additional credentials associated with other messages corresponding to the other applications.

13. The system of claim 9 where the interface component is further configured to forward at least some of the messages, or copies thereof, to the management component.

14. The system of claim 9 where the action comprises at least one of routing, filtering, or transforming some of the messages.

15. The system of claim 9 further comprising a third component configured to communicate results of the action to a management server.

16. At least one computer-readable storage medium having instructions stored thereon that configure at least one physical processor to perform actions upon execution of the instructions, the actions comprising:
implementing a virtual machine;
communicatively coupling the virtual machine to a virtual switch via which an application hosted by the virtual machine communicates via messages with another entity, where the virtual switch is implemented at least in part by the at least one physical processor;
maintaining, by a management component implemented at least in part by the at least one physical processor, metadata that includes information describing the virtual machine, an identification of the application hosted by the virtual machine, and credentials associated with the messages;
observing, by an interface component of the virtual switch and based on the credentials and the identification of the application, at least a portion of the messages; and
performing, by the management component, an action as a function of the observed at least a portion of the messages.

17. The at least one computer-readable storage medium of claim 16, the actions further comprising observing other messages of other virtual machines as they are deployed, removed, and moved.

18. The computer-readable storage medium of claim 16, the actions further comprising decrypting, using the credentials, the at least a portion of the messages.

19. The computer-readable storage medium of claim 17 where the metadata further includes additional information describing the other virtual machines, additional identification of other applications hosted on the other virtual machines, and additional credentials associated with other messages corresponding to the other applications.

20. A physical computing device, comprising:
a switch via which an application hosted by a virtual machine communicates via messages with another entity;
memory comprising metadata that includes an identification of the application and credentials associated with the messages;
an interface component of the switch configured to observe, based on the credentials and the identification, at least a portion of the messages; and
a management component configured to perform an action based on the observed at least a portion of the messages.

21. The physical computing device of claim 20 where the virtual machine is hosted a separate physical computing device.

22. At least one computer-readable storage medium having instructions stored thereon that configure at least one physical processor to perform actions upon execution of the instructions, the actions comprising:
observing, based on an identification of an application that communicates via messages with another entity, the application hosted by a virtual machine, and further based on credentials associated with the messages, a portion of the messages; and
performing an action based on the observed portion of the messages.

23. The at least one computer-readable storage medium of claim 22, the action comprising generating one or more management metrics.

* * * * *